June 10, 1941.  T. J. VANSTONE ET AL  2,244,927

WHEEL PRESS

Filed March 16, 1938  4 Sheets-Sheet 1

June 10, 1941.  T. J. VANSTONE ET AL  2,244,927
WHEEL PRESS
Filed March 16, 1938  4 Sheets-Sheet 2

Patented June 10, 1941

2,244,927

UNITED STATES PATENT OFFICE 2,244,927

WHEEL PRESS

Thomas J. Vanstone, Walter E. Vanstone, and Elmer G. Etes, Rockford, Ill.

Application March 16, 1938, Serial No. 196,164

14 Claims. (Cl. 153—32)

This invention relates to wheel presses of the type designed particularly for the straightening of automobile wheels and the like, though not limited solely to automobile wheels.

The invention is primarily concerned with a device for straightening automobile wheels of the pressed steel and wire spoke types which, as a result of accident, are frequently bent or distorted out of shape. Unless the damage to the wheel is too great, it has been found to be economical to straighten the wheel rather than substitute an entire new wheel. For this purpose numerous devices have been suggested and employed, all of which are subject to serious objections. In some cases the cost of the tools required becomes almost prohibitive, as in the case of straightening methods involving the use of shoes or dies against which the wheel or the rim of the wheel is pressed or hammered to re-form the same. Such methods become expensive due to the wide variety in wheel shapes and sizes, each of which requires a different die. Others suggested devices while free of the above-mentioned objection are difficult to use in that they require a considerable number of operations and are inconvenient in use so that considerably more time is required in performing the straightening operations.

An aim of the present invention is the provision of a generally improved wheel press of simplified design, of greater accessibility, greater accuracy in operation, and greater speed of operation.

Another object of the invention is the provision of a wheel press so constructed that the wheels are straightened substantially without the use of dies and with fewer operations than in the past.

A still further object of the invention is the provision of a wheel press capable of applying power directly at the desired points and in sufficient degree to rapidly perform the required bending operations.

Another aim of the invention is the provision of a wheel press capable of operating on both sides of the wheel and around the entire periphery thereof while the wheel occupies a fixed position in the press.

An important object of the invention is the provision of a press of greater adaptability and one capable of taking wheels of substantially unlimited size.

Other objects and advantages will become apparent from the following description and the accompanying drawings, in which—

Figures 1, 15:
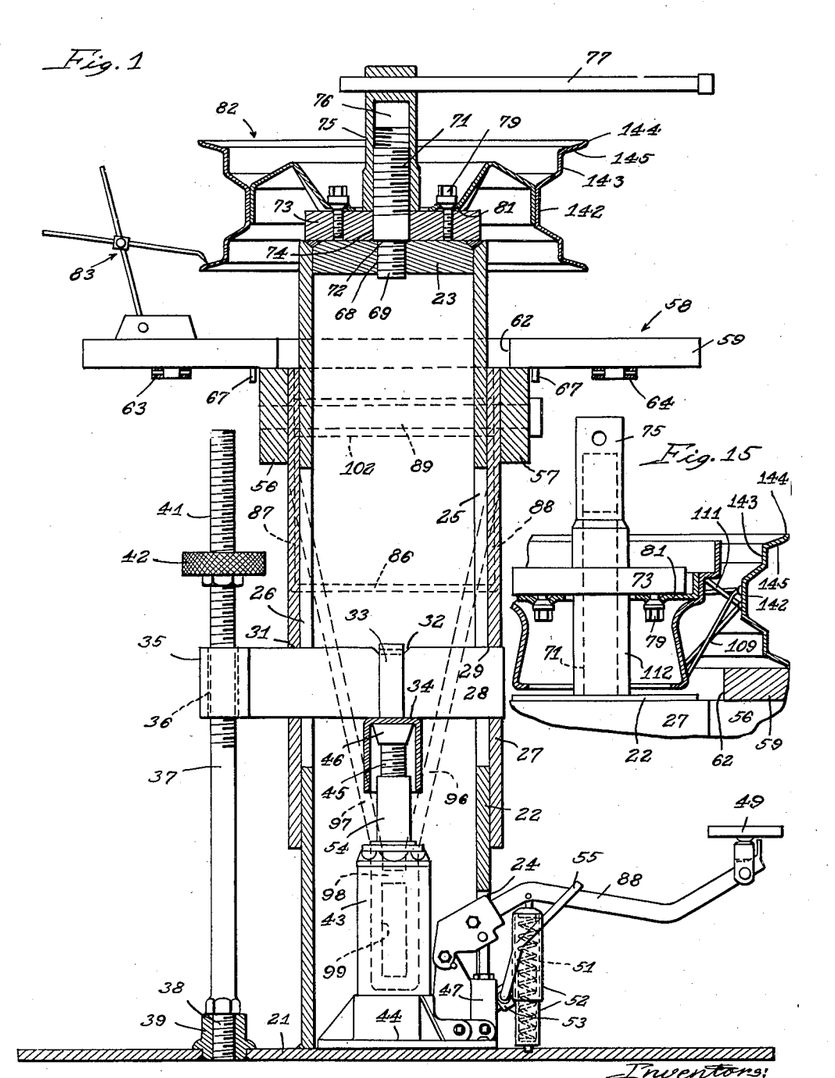
Figure 1 is a vertical section through a wheel press embodying the invention.
Fig. 15 is a view showing the manner in which the wheel is reversed on the center column of the machine.

Referring first to Figure 1, the embodiment herein shown has a base designated generally by the numeral 21 formed of heavy gauge steel plate and of a diameter sufficient to support the press rigidly and prevent tipping under the forces applied thereto. Welded to the center of the base 21 is a vertically disposed tube 22 forming a central column and guide for the press mechanism. The tube is welded to the base at its lower end and is closed at its upper end by a plate 23 welded into the tube. The tube has an opening 24 adjacent its lower end and diametrically spaced slots 25 and 26 extending longitudinally thereof for purposes presently to be described. Positioned exteriorly of the tube or column 22 is a tubular sleeve 27, the inner surface thereof being but slightly greater in diameter than the outside diameter of the column 22 so as to fit snugly thereon, the column serving as a guide and lateral support for the tube. Extending transversely of the sleeve 27 is a crossbar 28, the bar passing through slots 29 and 31 of the sleeve and through the slots 25 and 26 of the column 22. The bar 28 has a slot 32 on its upper edge substantially on the axis of the column 22 for the reception of a yoke 33, the lower end of the yoke having a cup-shaped guide member 34 abutting against the lower edge of the bar 28. One end of the bar 28 has a boss 35 provided with a bore 36 for slidable reception on a rod 37 positioned vertically on the base 21 by means of a threaded end 38 engaging a nut 39 threaded and welded into the base plate 21. The upper end of the rod 37 is threaded as shown at 41 for the reception of a knurled hand nut 42 adapted upon rotation to travel up and down the rod to act as a stop for the bar 28 and associated parts, as will presently be described.

Means are provided for moving the bar 28 and consequently the sleeve 27 up and down with respect to the column 22. Preferably this means is located within the column 22, and while numerous devices may be used, a hydraulic jack designated generally by the numeral 43 is herein provided having a base 44 affixed to the plate 21. The screw 45 and head member 46 are received within the cup 34 which serves as a guide for the head member to maintain the desired relationship between the bar 28 and the head member 46 in cases where the bar is lifted away from the jack 43. The jack has the usual injector 47 and is provided with a foot lever 48 extending out of the column through the opening 24, the lever being provided with a foot pedal 49 for actuating the lever in a pumping stroke. A compression spring 51 enclosed within a telescoping housing 52 acts between the base plate 21 and the lever 48 to return the lever after its operative injection stroke. A valve 53 on the jack serves to release the pressure therein and permit the head member 46, the screw 45 and the piston 54 of the jack to lower. The valve is actuated by a foot lever 55 extending outwardly to convenient position for actuation by the foot of the operator and having a spring (not shown) acting between the base plate 21 and an arm 56 (Fig. 2) for moving the valve to the closed position. Thus, when the lever 48 is reciprocated by the foot of the operator, the piston 54 is projected out of the jack against the crossbar 28, which in turn moves upward in the slots 25 and 26 of the column 22 carrying with it the sleeve 27, the bar abutting against the upper edges of the slots 29 and 31 for this purpose. The boss 35 likewise moves upward along the rod 37. When the operator depresses the valve lever 55, the weight of the parts carried on the jack are sufficient to cause the piston 54 to be depressed and the sleeve 26 consequently descends on the column 22.

Figure 2:
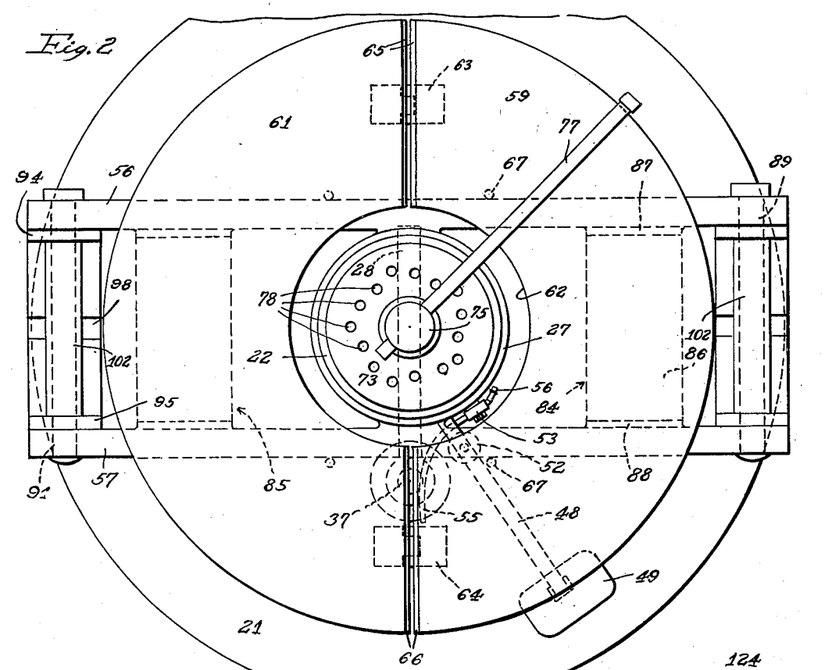
Fig. 2 is a top view thereof.

Spaced table bars 56 and 57 are secured substantially midway between their ends to the sleeve 27 adjacent its upper end as best shown in Figure 1, the bars being welded to the sides of the sleeve for rigid support thereon. A table, designated generally by the numeral 58, is supported on the table bars and consists of two half rings designated generally by the numerals 59 and 61, the periphery of the table being circular and the table having a central opening for the passage of the column 22, the edge 62 of the opening being spaced from the column as shown in Figs. 1 and 2. The two half rings 59 and 61 are secured together by means of hinges 63 and 64, the abutting ends of the half rings being tapered as shown at 65 and 66 to permit of either half being tilted with respect to the other half. The table is held against lateral displacement by pins 67 depending from the lower surface of the table and abutting against the sides of the table bars 56 and 57 (see Fig. 2). The table is formed of very heavy metal plate such as to resist bending or any substantial distortion under the maximum pressure which can be applied thereto by the jack 43 or by this jack in combination with other jacks, as will presently be described.

Improved means are provided for securing the wheel in position upon the column 22. As heretofore described, the plate 23 is welded into the top of the tube in such a way as to provide a substantially smooth solid upper end therefor, as best shown in Figure 1. The center of the plate 23 is drilled and tapped on the axis of the tube, as shown at 68, and receives a centering pin having a threaded portion 69 for engagement with the bore 68 and a larger threaded portion 71 providing a shoulder 72 abutting against the upper surface of the plate 23. The device is arranged for convenient removal and replacement of the centering pin so that longer or shorter pins may be employed depending upon the wheel requirements. The pin serves to center a die plate designated generally by the numeral 73 and hold the die plate against lateral or tilting movement, the die plate having an opening 74 having a close fit on the pin but capable of rotation on the top of the column about the pin. A cap 75 having a central threaded bore 76 is adapted to be threaded onto the pin to bear at its lower edge against the die plate and so confine and secure the die plate against rotation. A handle 77 permits of convenient tightening and loosening of the cap by the operator. The die plate 73 has a plurality of threaded holes 78 for the reception of the conventional wheel bolts 79 of an automobile or other wheel. The holes 78 are so arranged and spaced as to care for any one of a large number of wheels, the die plate shown in Fig. 2 being capable of receiving the bolts of approximately 75% of all automobile wheels now in use. It will be understood that additional die plates may be employed having holes to coincide with the bolt holes of any wheel. The bolts 79 are screwed down so as to secure the hub portion 81 of the wheel designated generally by the numeral 82 against the die plate. Thus it will be seen that by loosening the cap 75 slightly so as to withdraw the lower edge thereof from contact with the die plate, the wheel may be rotated about the centering pin. This is an important feature of the invention, in that it permits of convenient gauging of the wheel. It will be seen that since the sleeve 27 is concentric with the column 22 and the centering pin is on the axis of the column 22, and also since the table is at right angles to the axis of the column, a surface gauge such as designated by the numeral 83 may be placed on the table and by rotating the wheel and die plate the accuracy of the wheel both as to eccentricity and other types of distortion may be determined. It will be noted that this determination may be conveniently and rapidly made at any point during the straightening operations simply by rotating the handle 77 slightly and swinging the wheel through a complete revolution. These measurements are further facilitated by the fact that the elevation of the table may be rapidly changed by a few reciprocations of the foot lever 48 or by actuation of the valve lever 55.

It will be seen that the junction between the sections 59 and 61 of the table lies at an angle of substantially 90° with respect to the table bars 56 and 57. In order to independently rotate these table sections about the junction thereof, saddles designated generally by the numerals 84 and 85 are attached to the table bars. These saddles consist of heavy gauge metal plates in the shape of U's each having a central portion 86 and angularly disposed side portions 87 and 88 welded or otherwise secured to the table bars at their free ends. These saddles are positioned between the table bars and beneath the table sections for the reception of elevating means, as will presently be described. Pins 89 and 91 extend between the table bars adjacent the ends thereof and slightly beyond the periphery of the table. Carried on each of the pins 89 and 91 are swinging arms designated generally by the numerals 92 and 93, each of these arms consisting of side members 94 and 95 journaled on the pins in a position against the inner surfaces of the table bars. The pins 89 and 91 have a sliding fit in the table bars and arms so that in certain uses of the machine the arms may be conveniently removed if desired. The side members 94 and 95 converge toward their free ends as shown at 96 and 97 (Figure 1) and are interconnected at a point spaced from the ends thereof as shown at 98 to provide a rectangular opening 99 adapted to receive an overhead bar 101. Normally the swinging arms occupy the position shown in Fig. 3 when only the inner side of a wheel is being worked upon. When the operator desires to work on the outer side of the wheel or on both sides of the wheel, the arms are swung from the position shown in Fig. 3 to the position shown in Fig. 10 and the ends of the bar 101 are inserted in the openings 99. The openings 99 are of such size that the bar 101 holds the arms in very nearly vertical position. The side members 94 and 95 of the arms are spaced by means of spacer sleeves 102 positioned on the pins 89 and 91.

Figure 7:
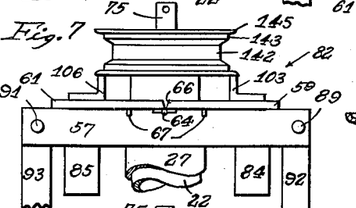
Fig. 7 is a fragmentary view similar to Fig. 3 showing a second type of straightening operation.
Figure 8:
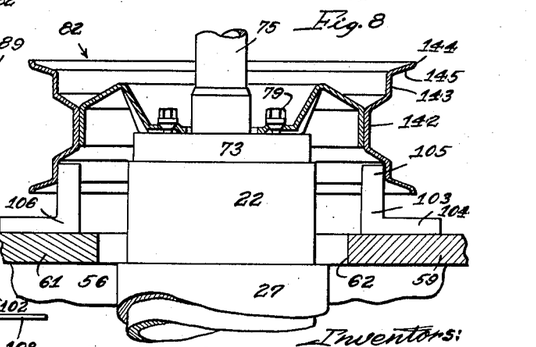
Fig. 8 is a vertical section through Fig. 7.
Figure 9:
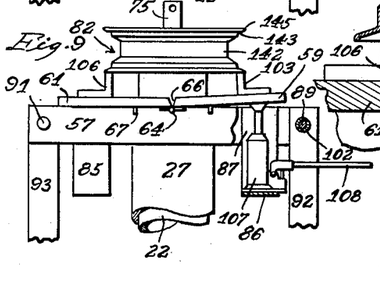
Fig. 9 is a view similar to Fig. 7 showing another phase of the straightening operations on a steel wheel.

The remainder of the press can best be described in connection with the mode of operation and the method of straightening wheels, which will now be described. Figs. 3, 4, and 7 to 9 show the manner of straightening wheels which are bent inward from the plane of the hub and particularly where the distortion is actually in the hub portion of the wheel. In this case the wheel is attached in the press as shown in Figure 1. Where only one side of the wheel is bent, a right angled block designated generally by the numeral 103 and having a base portion 104 and upright portion 105 is seated on the table below the downwardly depressed portion of the wheel. Thereupon the injector lever 48 is reciprocated by the foot, the operator adjusting the position of the block to bring the upper edge thereof into suitable engagement with the lower side of the wheel rim as shown in Fig. 4. Upon continued upward movement of the table, the metal of the wheel will be bent slightly in the hub by tilting action of the block on the wheel. This action is continued or repeated until the gauge 83 shows, upon rotation of the wheel about the centering pin, that the hub has been straightened. This is normally the first step in the wheel straightening operations and is usable where the wheel is sprung in the hub to only a relatively small degree. When the wheel is badly sprung in the hub, straightening thereof is conducted as will be later described, for it will be observed that too great an upward pressure on the wheel may cause the holes in the hub to be ruptured, or in other words, the hub to be pulled off over the bolts 79. Where the wheel is dished slightly inward and is dished substantially equally on both sides, a second block 106 identical with the block 103 is employed and positioned on the table diametrically opposed to the block 103, as shown in Figs. 7 and 8. The table is then raised by actuation of the lever 48 until the upper edges of the blocks engage the lower side of the wheel as shown in Fig. 8 which, upon continued upward movement, causes the two sides of the wheel to be brought into alignment. Here again the straightening action must not be too severe and the end of the operation is determined by loosening the cap 75 and checking the wheel by rotating the same against the gauge 83.

Where the wheel is dished unequally the blocks 103 and 106 are used as described in connection with Figs. 7 and 8 until the side having the smallest run-out is brought into alignment. At this point a jack 107 seated in the saddles 84 and 85 and bearing against the diameter of the table sections is actuated as shown in Fig. 9 by means of a handle 108 or otherwise so as to tilt the corresponding table section to apply continued bending force to the more badly distorted side of the wheel. This operation is continued or repeated until by rotation of the wheel the gauge 83 shows the same to be running true.

Figure 5:
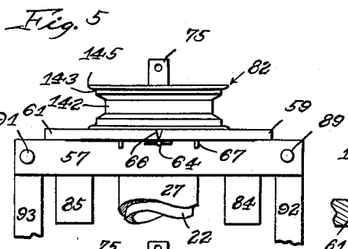
Fig. 5 is a fragmentary elevation similar to Fig. 3 showing a wire wheel in position on the press.
Figure 6:
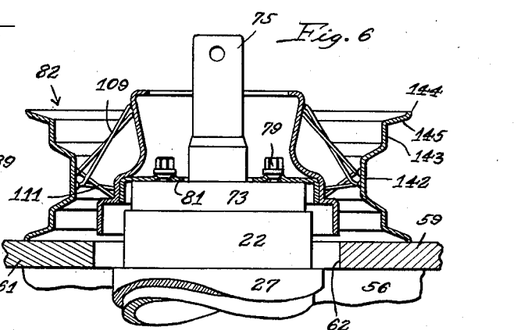
Fig. 6 is an enlarged vertical section of Fig. 5 showing the manner of securing the wire wheel in position for straightening operations.

In Figs. 5 and 6 there is shown the manner in which the press is used in the straightening of wire wheels when the rim of the wheel is out of alignment with the hub. In this case the hub is attached to the column as heretofore described and the table is brought up against the rim, forcing the rim into alignment with the hub. It will be observed that the opening in the center of the table is sufficient to permit the passage of the hub where this is necessary. When the rim is brought into alignment the spokes 109 thereof are heated, usually with a gas torch, so as to shrink the same. When necessary to move the rim inward with respect to the hub or when necessary to shrink the opposite row of spokes designated generally by the numeral 111, the wheel and die plate are inverted on the column as shown in Fig. 15, a spacer sleeve 112 being inserted around the centering pin and on the end of the column so as to space the die plate a sufficient distance from the end of the column. The sleeve 112 or sleeves similar thereto except for length are also provided for use in inverting pressed steel wheels such as that shown in Figure 1 on the relatively few occasions on which it is necessary to invert the wheel. When the wheel is so inverted the table is brought up against the opposite side of the rim as heretofore described either moving the rim longitudinally of the hub or bringing the same into alignment, whereupon the row of spokes 111 is shrunk as heretofore described.

Figures 10, 11, 12, 13, 14, 18, 19, 20:
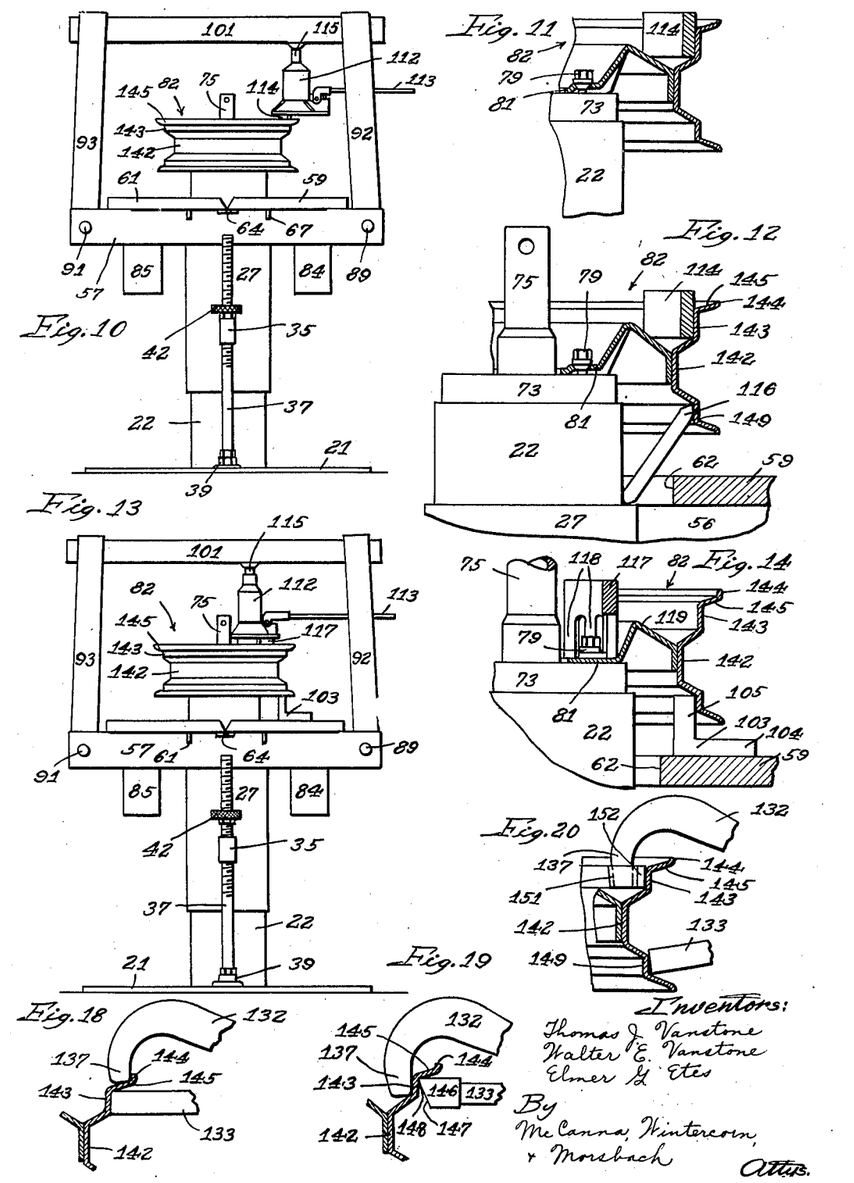
Fig. 10 is an elevation showing the parts in position for a further straightening operation of the type in which the wheel is bent upwardly.
Fig. 11 is a section through the wheel and straightening block of Fig. 10.
Fig. 12 is a view similar to Fig. 11 showing the manner of straightening an eccentric wheel.
Fig. 13 is a view similar to Fig. 10 showing a straightening operation in the hub of the wheel.
Fig. 14 is a section through the wheel, the wheel hub and table showing the relationship of the parts corresponding to Fig. 13.
Figs. 18, 19 and 20 are fragmentary views showing the manner of using the rim tool.

In Figs. 10 to 14, inclusive, there is shown the manner in which outwardly directed bends are removed from the wheel. It will be understood, however, that frequently a wheel will have both inwardly directed and outwardly directed bends in which situation the machine will be employed from the start with the arms 92 and 93 above the table as shown in these figures, the work being done on opposite sides of the wheel simultaneously or successively as conditions may require. It will also be understood that all of the operations heretofore described may be conducted with the arms in their upper position but that the arms are removable from this position for the purpose of allowing greater convenience in manipulation and also for the purpose of permitting the straightening of wheels larger than the table. In the latter case long metal plates are positioned on the top of the table to contact the rim of the wheel. It is also pointed out at this time that the various operations herein described are by way of illustration and are selected for this purpose from among many straightening operations for which the machine is adapted and which will be familiar to those skilled in the art. Likewise it will be understood that the various operations herein described may be combined in various ways for more complicated bending procedure. In Figs. 10 and 11 the means for straightening a wheel which is bent outwardly at one side, is shown, and includes a jack 112 having an operating handle 113, the jack being seated on an arcuate bearing block 114 positioned against the outer side of the wheel as shown in Fig. 11. The screw, plunger or other jack part bears against the overhead bar 101. In this operation the table is adjusted to the proper height and the hand wheel 42 rotated on the screw 37 until it comes into abutment with the boss 35. The jack 112 is then actuated applying pressure to the block 114 and forcing the corresponding side of the wheel downward, thereby bending the wheel in the hub, the hand wheel 42 preventing upward movement of the table under the force of the jack 43.

In Fig. 12 I have shown the means and method for removing eccentricity from the rims of wheels. In this instance the apparatus is set up as shown in Fig. 10 with the jack 112 in place as therein shown. However, in this instance a bar 116 in the shape of a flat strip of metal arcuate at its ends, is interposed between the lower side of the rim and the upper edge of the sleeve 27. In this instance the flat strip 116 is formed of stock $\frac{7}{16}''$ thick and 2'' wide, of appropriate length and rounded on the ends. During this operation the hand nut 42 is backed away from the boss 35 in the manner shown in Fig. 13 so that upon the actuation of the jack 112 pressure is simultaneously applied to the upper and lower sides of the wheel under which circumstances the angularity of the strip 116 causes the rim to be bent outward radially, thus removing the eccentricity from the rim and wheel.

Figure 3:
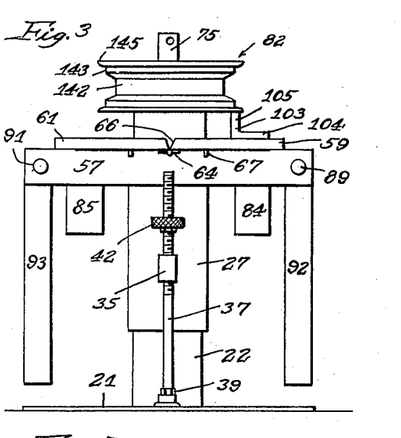
Fig. 3 is an elevation showing the press in one phase of the straightening operation.
Figure 4:
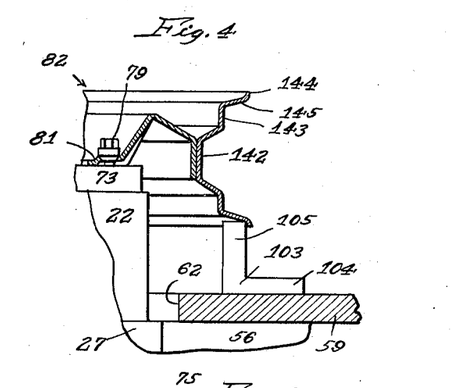
Fig. 4 is an enlarged section of Fig. 3.

In Figs. 13 and 14 there is shown the method and means for straightening wheels wherein there is excessive distortion in and near the hub of the wheel such as could not be removed in the manner shown in Figs. 3 and 4 without damaging the bolt holes in the hub. In this instance an arcuate pressure block 117 is employed having a plurality of spaced fingers 118 along its lower arcuate edge adapted to rest upon the hub of the wheel between the bolts 79 and other obstructions present on the hub. In this instance the pressure block is of sufficient width to extend from the hub to a point above the plane of the wheel rim, and the jack 112 is seated thereon. The block 103 or 106 is seated upon the table with its upper edge bearing against the rim and the hand nut 42 is backed away from the boss 35 as shown in Fig. 13. Upon actuation of the jack 112 the table is raised by means of the bar 101 and the arms 92 and 93, and at the same time pressure is applied to the hub through the pressure block 117 to hold the hub firmly against the die plate. In this position of the parts very severe pressure may be applied to the wheel to correct excessive distortions in the hub and to correct distortions in the web connecting the hub and the rim, particularly in the area designated by the numeral 119 in Fig. 14.

It will be understood that the operations described in connection with Figs. 10 and 13 may also be performed where the wheel is dished by employing a second jack and pressure blocks on the opposite side of the hub in a manner analogous to Figs. 7 and 9 so as to simultaneously bend both sides of the wheel. It will likewise be understood that during these straightening operations the alignment of the various parts of the wheel may be checked by means of the surface gauge 83 in the manner heretofore described.

Through one or all of the operations heretofore described, depending upon the type of distortion in the particular wheel, the wheel should have been brought to a condition in which the same will run true, and the next operations are those of straightening and re-forming the various portions of the rim per se, that is, the straightening of bent flanges and shoulders on the rim and short bends of dents in the well of the rim. For this purpose the device shown in Figs. 16 to 20, inclusive, is provided. This means consists of a tool carried on the sleeves 102 comprising a body member 121 pivotally supported by means of a pin 122 on spaced arms 123 attached to a sleeve in the form of two half tubular portions 124 and 125 adapted to seat around the sleeve 102. The arms 123 are rigidly attached to the tubular portion 124 and the tubular portion 125 is hinged as shown at 126 along one edge thereof, the opposite edge carrying spaced clamping bolts 127 adapted to clamp around the sleeve 102 and permit rotation of the tool thereon. Through this means the tool may be transferred from one side of the press to the other should occasion demand and may also be removed from the press where a large number of straightening operations of the nature shown in Figs. 3 to 9 are performed. This also permits the tool to be rotated in a clockwise direction facing Fig. 16 so that the tool hangs down along the side of the press out of the way of the operator during other straightening operations. The body portion 121 has a socket portion 128 adapted for the reception of a handle 129 for actuation of the tool. The body portion also has a central slot 131 for the reception of one end of jaws 132 and 133, the jaw 132 being pivotally carried therein above the pivot point 122 by means of a pin 134 and the jaw 133 being pivotally carried therebelow by a pin 135 in such manner that rotation of the body about the pin 122 causes relative longitudinal movement of the jaws. The jaw 132 is curved upwardly adjacent its free end as shown at 136 and thence downwardly as shown at 137 to give the jaw a hook-line shape. The jaw is also flattened toward its free end as will appear from Fig. 17. The jaw 133 is in this instance substantially rectangular in cross sectional shape and is slightly shorter than the jaw 132.

Figures 16, 17:
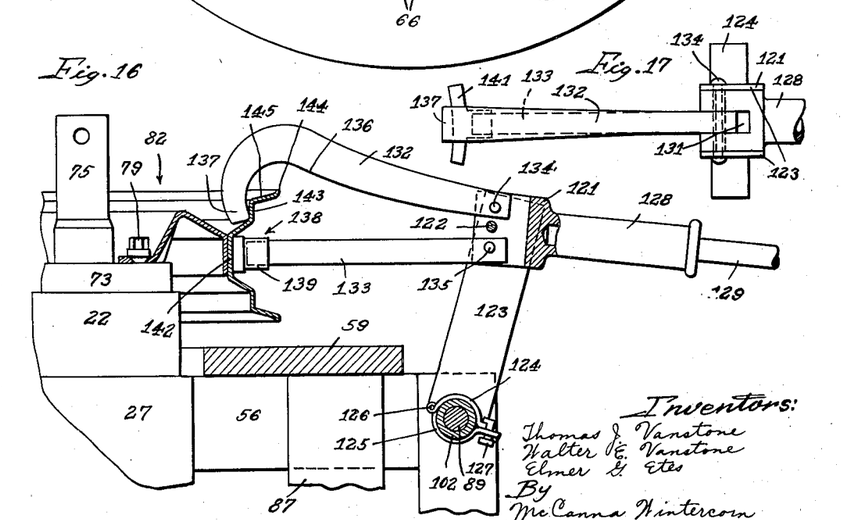
Fig. 16 is a fragmentary section showing the rim straightening portion of the press.
Fig. 17 is a top view of the rim tool shown in Fig. 16.

In Fig. 16 the rim tool is shown in position for the straightening of the shoulder and connecting wall of a wheel rim. In this instance a foot designated generally by the numeral 138 and having a socket portion 139 and bearing plate 141 is positioned on the end of the jaw 133 adapted to bear against the well 142 of the wheel. The wide bearing plate 141 prevents distortion of the well portion during the operation of the tool. The end 137 of the jaw 132 is brought into position against the back of the shoulder portion 143 of the rim, and it will be seen that when the handle 129 is depressed the jaw 132 will be moved toward the right facing Fig. 16 and the end 137 will move the metal of the shoulder outward. For short bends this may be sufficient to straighten the shoulder, but where the bend is longer it may be necessary to rotate the wheel slightly and repeat the operation until the shoulder is brought out to the desired extend as indicated by the surface gauge 83 upon rotation of the wheel as heretofore described.

In Fig. 18 there is shown the means and manner of straightening the flange of the rim, and in this instance the end of the jaw 133 is brought against the shoulder 143 and the end 137 of the jaw 132 is brought against the outer surface of the rolled edge 144 of the rim flange 145. Upon downward movement of the handle 128 the rolled edge 144 is drawn outward radially bringing the rolled edge of the flange to the proper curvature. Here again the operation may be repeated at spaced points along the flange to accomplish the end result.

In Fig. 19 are shown the manner and means for reforming the rim flange in which instance a foot 146 is positioned on the jaw 133 having a beveled face 147 providing a sharp edge 148 adjacent the upper surface thereof for engagement in the corner between the shoulder and the flange. The end 137 of the jaw 132 is positioned against the back of the shoulder 143, and upon depression of the handle 129, the shoulder is forced against the end 137 re-forming the shoulder and the flange.

In Fig. 20 there is shown the means and manner of tilting the rim, in which instance the jaw 133 is brought against the inner flange 149 of the wheel and the jaw 132 provided on its end with a foot having a socket 151, and a bearing plate 152 is brought against the back of the upper shoulder 143. Upon downward movement of the lever 129 the rim will be tilted by action of the jaws. It will be understood that in the various operations the jaws may be used with or without appropriate feet depending upon the nature of the operation to be performed, and that during the rim straightening operations the table is raised or lowered as may be required to affectuate proper angularity between the jaws and the work. The rim straightening operations are conducted in substantially the same manner on both wire spoke wheels and pressed steel wheels.

Attention is briefly directed to the manifold advantages of the invention. It will first be observed that the wheel hub is at all times maintained at right angles to the axis of the column 22 and the sleeve 27, and parallel with the table, thus always providing an accurate starting point for the work. Furthermore, the forces in substantially all cases are applied in a direction parallel to the axis of the work and work support and all movements are parallel to the axis of the column. Another important advantage is the fact that the operator can simultaneously work from both sides of the wheel or can alternately work from opposite sides of the wheel. Furthermore, the wheel can be easily inverted where necessary without removing the same from the die or without disturbing the parallelism of the parts. Another important advantage is the convenience in that movements of the table are accomplished while the operator's hands are free, that is, by foot reciprocation of the injector lever 48 or by foot operation of the valve. It will also be observed that the operator can work from all sides of the press without hindrance from bulky mechanism projecting from or located at the sides of the table. A further advantage of the construction is in the fact that the table is movable and the use thereon of blocks permits the power to be applied to the wheel directly at the desired points. An important feature is the facility with which the work may be checked as the wheel straightening operations proceed, since by a fraction of a turn on the handle 77 the wheel is released and may be rotated for checking the matter of alignment and to determine when the parts have reached their proper location, and a correspondingly simple operation refastens the wheel for continuation of the work. A still further advantage of the invention lies in the fact that the same tools and equipment are used regardless of the size or shape of the wheel, and no special dies or forms are required, and in the fact that the press is capable inherently of conducting all of the necessary straightening operations. The circular table provides free access from all sides and the sectional construction thereof greatly facilitates the work and shortens the time required in that it lends flexibility to the straightening operations and greatly reduces the number of separate operations which would otherwise be required to straighten the wheel. The hinges on the table serve to keep the sections of the table in place with respect to each other and the pins 67 permit the table to be moved from side to side for certain specialized work, such, for example, as the truing of eccentric wheels as shown in Fig. 12.

A further advantage lies in the fact that the rim straightening operations are equally effective on either pressed steel wheels or wire spoke wheels, and that the press is equally effective in straightening of either type of wheel.

It will be understood that the apparatus and method herein disclosed are by way of illustration, and that numerous changes may be made within the spirit of the invention as set forth in the following claims.

We claim:

1. The combination in a wheel press of means for supporting a wheel at the hub thereof, a table supported in a plane parallel to the wheel hub, and means for moving the table toward and away from the wheel to exert a bending pressure thereon, a part of the table being movable out of parallelism with the hub to exert independent bending pressure on selected portions of the wheel upon movement of the table against the wheel.

2. The combination in a wheel press of a central stationary column, means at one end thereof for supporting a wheel in axial relation therewith, a sleeve on said column movable thereon as a guide, a table on said sleeve adjacent the end thereof next to said wheel in a plane transverse to the axis of the sleeve and column, an arm on said sleeve projecting beyond said wheel, means on said arm disposed across said wheel and in spaced relation thereto, and means acting between said means and the adjacent side of said wheel for moving the sleeve and table to simultaneously exert a bending pressure on opposite sides of the wheel.

3. The combination in a wheel press of a hollow central stationary column, means at the upper end thereof for supporting a wheel in horizontal position, a sleeve on said column movable thereon as a guide, a table on said sleeve adjacent the upper end thereof and below the wheel in a plane transverse to the axis of the sleeve and column, and means within said column for moving the sleeve and table vertically to exert a bending pressure on the wheel.

4. The combination in a wheel press of a hollow central stationary column having diametrically opposed slots extending longitudinally thereof, means at one end thereof for supporting a wheel in axial relation therewith, a sleeve on said column movable thereon as a guide, a table on said sleeve adjacent one end thereof in a plane transverse to the axis of the sleeve and column, a crossbar extending through said slots and into said sleeve, and means acting on said crossbar within the column to move the sleeve and table longitudinally thereof and exert a bending pressure on the wheel.

5. The combination in a wheel press of a central stationary column, means at one end thereof for supporting a wheel in axial relation therewith, a sleeve on said column movable thereon as a guide, a table on said sleeve adjacent the end thereof next to said wheel in a plane transverse to the axis of the sleeve and column, a cross bar extending across said wheel on the side opposite said table and in spaced relation to said wheel, means for moving the sleeve to exert a bending pressure on the wheel, and adjustable stop means for limiting movement of said sleeve and table under the action of said last mentioned means acting between said cross bar and the adjacent side of said wheel.

6. The combination in a wheel press of a hollow central stationary column having diametrically opposed slots extending longitudinally thereof, means at one end thereof for supporting a wheel in axial relation therewith, a sleeve on said column movable thereon as a guide, a table on said sleeve adjacent one end thereof in a plane transverse to the axis of the sleeve and column, a crossbar extending through said slots and into said sleeve, means acting on said crossbar within the column to move the sleeve and table longitudinally thereof and exert a bending pressure on the wheel, and adjustable stop means acting on said crossbar to limit movement of said sleeve and table in one direction.

7. The combination in a wheel press of a hollow central stationary column having diametrically opposed slots extending longitudinally thereof, means at one end thereof for supporting a wheel in axial relation therewith, a sleeve on said column movable thereon as a guide, a table on said sleeve adjacent one end thereof in a plane transverse to the axis of the sleeve and column, a crossbar extending through said slots and into said sleeve, a hydraulic jack within said column acting on said crossbar to move said sleeve in one direction to exert a bending pressure on the wheel, and means between the crossbar and said jack for maintaining alignment of the crossbar and jack.

8. The combination in a wheel press of a central stationary column, means at one end thereof for supporting a wheel in axial relation therewith, a sleeve on said column movable thereon as a guide, a table on said sleeve adjacent the end thereof next to said wheel in a plane transverse to the axis of the sleeve and column, a cross bar extending across said wheel in spaced relation thereto, means for connecting said cross bar to said sleeve, means acting between said cross bar and said wheel for moving the sleeve and table to exert a bending pressure on the wheel, and foot operated means moving said sleeve and table through approach movement into bending position with respect to said wheel.

9. The combination in a wheel press of a central stationary column, means at one end thereof for supporting a wheel in axial relation therewith, a sleeve on said column movable thereon as a guide, a sectional table on said sleeve adjacent said wheel in a plane transverse to the axis of the column, means for moving the sleeve longitudinally of the column to move the table as a unit through a bending stroke, and means for independently moving said table sections to apply local bending pressure to the wheel.

10. The combination in a wheel press of a stationary column, means at one end thereof for supporting a wheel at the hub in axial relation therewith, a sleeve on said column movable thereon as a guide, a table on said sleeve adjacent said wheel in a plane parallel to the wheel hub, said table comprising two table sections hinged together for tilting movement with respect to each other, means for moving the sleeve longitudinally of the column to move the table as a unit through a bending stroke and means for independently tilting said table sections to apply local bending pressure to the wheel.

11. The combination in a wheel press of a stationary column, means at one end thereof for supporting a wheel at the hub in axial relation therewith, a table transverse to the axis of said column movable thereon as a guide toward and away from the wheel, a cross bar carried on said table and disposed above said wheel, means acting between the upper side of said wheel and said cross bar for applying force to the upper side of the wheel and simultaneously applying the counterforce to said table and against the opposite side of the wheel, and means on said table for applying local pressure to the rim of the wheel upon approach movement of the table.

12. The combination in a wheel press of a stationary column, means at one end thereof for supporting a wheel at the hub in axial relation therewith, a table movable thereon as a guide toward and away from the wheel, arms at opposed sides of said table rotatable between inoperative positions below said table and positions thereabove, said arms being movable with the table, a crossbar carried on said arms above said wheel, a pressure block positioned against said wheel, and means interposed between the block and the cross arm for applying pressure to the block to bend the wheel.

13. The combination in a wheel press of a stationary column, means at one end thereof for supporting a wheel at the hub in axial relation therewith, a table movable thereon as a guide toward and away from the wheel, arms at opposed sides of said table rotatable between inoperative positions below said table and positions thereabove, said arms being movable with the table, a crossbar connecting said arms above said wheel, a pressure block positioned against the upper side of said wheel, a pressure block between said table and the lower side of said wheel, and means interposed between said arm and the block at the upper side of said wheel for applying pressure to said wheel through said upper block and for moving said table upward to simultaneously apply pressure to the wheel through said lower block.

14. The combination in a wheel press of a stationary column, means at one end thereof for supporting a wheel at the hub in axial relation therewith, a table movable thereon as a guide toward and away from the wheel, arms at opposed sides of said table rotatable between inoperative positions below said table and positions thereabove, said arms being movable with the table, a crossbar carried on said arms above said wheel, a pressure block positioned against the upper side of said wheel, means interposed between the block and the cross arm for applying pressure between the block and the cross arms, and means for limiting upward travel of said table.

THOMAS J. VANSTONE.
WALTER E. VANSTONE.
ELMER G. ETES.

CERTIFICATE OF CORRECTION.

Patent No. 2,244,927.                                             June 10, 1941.

THOMAS J. VANSTONE, ET AL.

It is hereby certified that error appears in the printed specification of the above numbered patent requiring correction as follows: Page 6, first column, line 39, claim 5, strike out "and table" and insert the same after "sleeve" in line 36, same claim; lines 40 and 41, strike out "acting between said cross bar and the adjacent side of said wheel" and insert the same after "means" in line 36, same claim 5; and second column, line 10, claim 8, after "means" insert the word --for--; and that the said Letters Patent should be read with this correction therein that the same may conform to the record of the case in the Patent Office.

Signed and sealed this 12th day of August, A. D. 1941.

(Seal)                                                                        Henry Van Arsdale,
Acting Commissioner of Patents.